(12) United States Patent
Nyman et al.

(10) Patent No.: US 6,706,186 B1
(45) Date of Patent: Mar. 16, 2004

(54) METHOD FOR EXTRACTING COPPER FROM AN AQUEOUS SOLUTION

(75) Inventors: Bror Nyman, Vanha-Ulvila (FI);
Stig-Erik Hultholm, Pori (FI); Launo Lilja, Pori (FI); Esa Lindell, Pori (FI);
Eero Ekman, Pori (FI); Juhani Lyyra, Espoo (FI); Raimo Kuusisto, Espoo
(FI); Pertti Pekkala, Espoo (FI)

(73) Assignee: Outokumpu Oyj, Espoo (FI)

( * ) Notice: Subject to any disclaimer, the term of this patent is extended or adjusted under 35 U.S.C. 154(b) by 0 days.

(21) Appl. No.: 10/019,967

(22) PCT Filed: May 4, 2000

(86) PCT No.: PCT/FI00/00397

§ 371 (c)(1),
(2), (4) Date: Apr. 5, 2002

(87) PCT Pub. No.: WO00/69538

PCT Pub. Date: Nov. 23, 2000

(30) Foreign Application Priority Data

May 14, 1999 (FI) .................................................. 991111

(51) Int. Cl.$^7$ .............................................. B01D 11/00
(52) U.S. Cl. ...................... 210/634; 210/639; 422/256; 423/24; 423/27
(58) Field of Search .............................. 210/511, 634, 210/638, 639; 422/256, 258, 259; 423/23, 24, 27; 366/348; 75/731

(56) References Cited

U.S. PATENT DOCUMENTS 3,666,446 A * 5/1972 Cook et al. .................... 423/24
4,173,616 A * 11/1979 Koenders et al. .............. 423/24
4,221,658 A   9/1980 Hardwick .................... 210/634
5,015,448 A * 5/1991 Vorlop et al. ................. 423/24
5,185,081 A   2/1993 Nyman et al. ............... 210/634
5,273,654 A * 12/1993 Severing .................... 210/634
5,662,871 A   9/1997 Nyman et al. ............... 422/259
6,242,625 B1 * 6/2001 Kordosky et al. .............. 423/24

FOREIGN PATENT DOCUMENTS

GB   2 117 666 A   10/1983

* cited by examiner

Primary Examiner—Joseph Drodge
(74) Attorney, Agent, or Firm—Morgan & Finnegan LLP (57) ABSTRACT

The invention relates to a method for extracting copper in liquid-liquid solvent extraction from aqueous solutions with a high sulphate content, by raising the viscosity of the extraction solution and by dispersing the aqueous solution into drops, achieving a dense drop aggregation. The viscosity of the extraction solution may be raised either by increasing the content of the actual extractant, the extraction reagent, in the extraction solution or by using a diluting agent with a higher viscosity than that of the diluting agent normally used. By raising the viscosity of the extraction solution the mixing durability of the extraction dispersion can be increased and resulting of that the amount of residual drops is decreased. Other advantages are that the extraction solution flow of the extraction process decreases in relation to the flow of the aqueous solution acting as the copper source and that the size of the extraction equipment needed is reduced.

18 Claims, 12 Drawing Sheets

METHOD FOR EXTRACTING COPPER FROM AN AQUEOUS SOLUTION

The present invention relates to a method for extracting copper in liquid-liquid solvent extraction from aqueous solutions with a high sulphate content, by raising the viscosity of the extraction solution and by dispersing the aqueous solution into drops, achieving a dense drop aggregation. The viscosity of the extraction solution may be raised either by increasing the content of the actual extractant, the extraction reagent, in the extraction solution or by using a diluting agent with a higher viscosity than that of the diluting agent normally used. By raising the viscosity of the extraction solution the mixing durability of the extraction dispersion can be increased and resulting of that, the amount of residual drops is decreased. Other advantages are that the extraction solution flow of the extraction process decreases in relation to the flow of the aqueous solution acting as the copper source and that the size of the extraction equipment needed is reduced.

Dilute aqueous solutions form when poor copper ores are leached directly. The copper content of such solutions is usually of the order of 1–4 g/l Cu. In addition neutral salts often accumulate in the solution, mainly aluminium and magnesium sulphates. Although the copper content does not rise above 1.5 g/l, the sulphate content may rise above 40 g/l, to between 40 and 120 g/l. Some of the sulphate may originate from the ore or the possible use of seawater. In the extraction process the aqueous solution is in a cycle between the extraction and the leaching and thus gradually accumulates the salts which raise the viscosity. Neutral salts can easily cause a viscosity increase harmful to the aqueous solution, even 3 cP, which also disturbs the dispersing of the aqueous and extraction solutions and results in high amounts of residual drops. In particular when dispersion is desired where the organic solution is continuous and the water in drops, an increased viscosity in the aqueous solution can make it difficult to achieve such a dispersion. Previously the increased viscosity caused by neutral salts and the resulting disadvantages were not taken into account.

In copper extracting processes a mixed organic extraction solution and aqueous solution is generally used in the ratio of O/A (organic/aqueous) 1.0–1.2. Present-day copper extracting processes usually follow recommendations given by extractant manufacturers, according to which the organic and aqueous solution of the extraction O/A ratio at all extraction stages of the extraction process should be of the order of 1.0, and the extractant content raised to 3.3–4.2 vol. % per every gram of copper, which comes in the direction of flow of the first extraction stage of extraction. In practice this means that if the Cu content of the aqueous solution is 1.5 g/l, the extractant content is maximum 6.3 vol. % according to the recommendations. Generally, when the amount of copper in the solution increases, the amount of extractant decreases relatively. The type of extractant is a chelating copper complexing agent, usually hydroxyoxyme, which forms a strong complex with copper, and one fact affecting the progress of copper extraction is how much extractant is present in relation to the amount of copper to be extracted.

Generally, alifatic or aromatic hydrocarbons, kerosenes, with a distillation range between 190–245° C. are used as the diluting agent for the copper extractant The viscosity of these substances is usually below 2 cP, and for aromatics even below 1.5 cP. It is also possible to us mixtures of aromatic and alifatic hydrocarbons as the diluting agent, where the aromatic content of the mixture is around 20–30 vol. %.

As previously stated, in copper extraction it is difficult to get a dispersion of an aqueous solution with a high sulphate content, minimum 40 g/l, where the organic phas is continuous and the aqueous solution in drops, although this is essential in order to improve extraction performance. According to th present invention, the viscosity of the extraction solution is now raised to the area of 3–11 cP, and this takes place either by raising the extractant content or by using a diluting agent with a high viscosity in the extraction solution. In addition to this, that the organic phase has been made continuous, the method has proved to have many other advantageous consequences. The essential features of the invention will become apparent in the attached patent claims.

A rise in the viscosity of the extraction solution clearly raises the mixing durability of the extraction dispersion. In this connection a mixing-durable dispersion means a dispersion where no drops below 0.2 mm appear when the mixing intensity is max. 0.15 kWh/m$^3$ in a mixing volume of 50 m$^3$. Volume-specific mixing power is dependent on the mixing volume so that the power required decreases slightly as the volume increases. Obviously the mixing itself also affects mixing durability. The mixers described in U.S. Pat. No. 5,185,081 have been settled on to use in the method according to the present invention. These mixers have a double helix, which helps to avoid locally increasing shear rate forces and the small drops generated as a result. When the viscosity of the organic phase has been raised according to the invention and the extraction dispersion made heavier and this dispersion combined with a very smooth, thoroughly uniform mixing of controlled intensity in the mixing area, the conditions are achieved where an evenly distributed mixing energy is not sufficient to attain a turbulence to form droplets. An evenly attenuated mixing creates a dispersion where the drop size is uniform and which thus possesses good separation characteristics. Since the amount of residual drops is small, the extraction result is clearly improved.

In addition to the increase in viscosity of the extraction solution, another key factor is the mixing ratio of the solutions. The denser the drop aggregation, the heavier and simultaneously more mixing-durable the dispersion. The most advantageous result is obtained when a dispersion is formed, where the extraction solution is continuous and the amount of water drops is raised.

When the viscosity of the extraction solution is raised, it has been found that an extraction solution with a higher viscosity is better able to keep a larger amount of the aqueous solution than normal inside it as drops. In the method according to our invention it is possible to lower the O/A ratio to between 0.7–1.0 without endangering the continuity of the extraction solution. In practice, this means that the extraction solution flow can be reduced in relation to the copper-containing feed solution (the aqueous solution) by the amount previously described. At the same time the extractant content of the extraction solution is increased to the extent that the mass flow of the extraction solution stays unchanged or increases a little. Thus the viscosity of the extraction solution can be raised successfully.

The factor by which the extractant content is raised compared with the normal recommendation in the method according to the present invention, varies between 1.2–5, and is preferably between 1.5–3. When very dilute copper-containing feed solutions with max. 2 g/l of copper are being treated, the factor may always rise to 5 i.e. according to our invention the extractant content would then be of the order of 7–25 vol. %, preferably 15–25 vol. %. When the feed solution copper content is between 2–4 g/l, the preferred extractant content is in the range of 15–30 vol. %. Generally, however, the extractant content does not increase above a content of 30% by volume. The viscosity of the extraction solution in this case rises to between 3–7 cP, which is enough to raise it to a clearly higher level than the viscosity of the aqueous solution. Normally, the aim is to achieve an O/A viscosity ratio of between 1.2–3, preferably 1.5–2. According to the invention, when extracting dilute copper solutions the extractant content in the extraction solution is presently set in the range of 7–30 vol. %, preferably 15–30 vol. %.

Regarding aqueous solutions containing over 4 g/l of copper, even an ordinary extractant content in the extraction solution gives a fairly good result. For these solutions, the use of an extractant factor of 1.2–2.0 times the recommendation improves the mixing durability of the dispersion. With the method according to the invention, however, it is possible to raise the extractant content in the extraction solution to 25–50 vol. %, when the copper content of the aqueous solution is 4–8 g/l and even up to 40–70 vol. % if the copper content of the solution is over 8 g/l. The viscosity of the extraction solution can also be raised partly or wholly with the use of a diluting agent. The distillation range and viscosity of the diluting agents generally used was mentioned earlier as being rather low. If other diluting agents are used, this can also raise the viscosity of the extractant. Alifatic hydrocarbon products can be chosen with a distillation range in the range of 220–275° C. or 240–270° C., and the viscosity of these substances measured at a temperature of ±25° C. is 2.7 or 3.2 cP. If it is desired to use aromatic hydrocarbons, the viscosity of hydrocarbons with a distillation span of 230–290° C. is about 3 cP. It is also possible to use mixtures of alifatic and aromatic hydrocarbons.

When treating dilute aqueous solutions containing less than 4 g/l of copper, there is a possibility in our invention of using hydrocarbon compounds that boil at a high boiling range as the diluting agent. The use of a diluting agent to increase viscosity is preferred since the diluting agent is always cheaper than the actual extractant. The proportion of diluting agent in the extraction solution can be between 30–93%. It is easier to achieve the required rise in viscosity without the density of the extraction solution increasing significantly with alifatic hydrocarbons. The use of alifatic hydrocarbons is also recommended for reasons of industrial hygiene.

It was mentioned above that when raising the viscosity of the extraction solution it is possible to decrease the external pumping of the extraction solution coming to the extraction stage from outside. If the rise in viscosity takes place with an extraction solution diluting agent, it is not possible to decrease pumping. On the other hand, when viscosity is raised with an extractant, xternal pumping of the extraction solution can be reduced significantly compared with the amount of copper-containing aqueous solution being conveyed to the extraction stage. If viscosity is raised both by increasing the extractant content and by using the aforementioned diluting agent, the amount of external pumping decreases in the same degree as the extractant content is increased.

The method according to our invention is described in the attached drawings, where.

Figure 1:
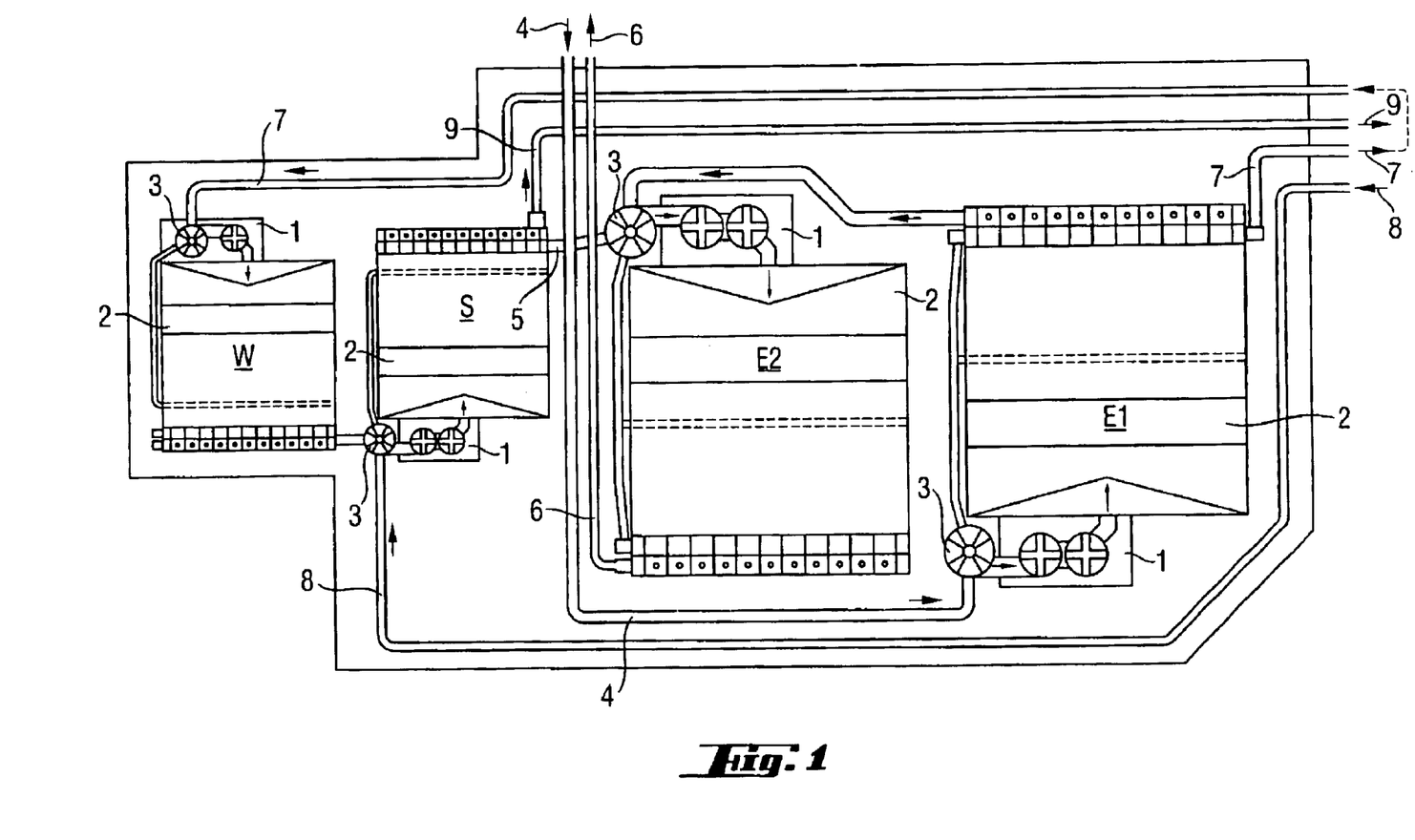
FIG. 1 shows a schematic view of the equipment used in the method of the present invention.

FIG. 1 describes a copper extraction process for treating dilute copper solutions. The process consists of two extraction stages, E1 and E2, one extraction solution washing stage W and one extraction solution stripping stage S. Both the extraction stages and the washing and stripping stages consist of a mixing section 1, a settler 2, and a pump 3 used to transfer the dispersion. The mixing section has at least one mixer, which is preferably equipped with the mixing devices described earlier. The principles of the extraction stages are the types described in e.g. WO patent application publications 97/40899, 97/40900, 97/40901 and 97/41938.

As usual, the extraction functions on a counterflow principle, whereby aqueous solution 4 comes first to extraction stage E1 and extraction solution 5 to stage E2. The aqueous solution exiting the final extraction stage E2, raffinate 6, is fed back to ore leaching, and copper-enriched extraction solution 7 is fed from E1 to washing W and stripping S. In practice, the extraction solution is circulated via storage tanks. Lean lectrolyte 8 is fed from electrolysis to the stripping stage where the copper contained in the organic phase is extracted. The aqueous solution 9 containing copper sulphate exiting the stage goes as rich electrolyte to electrowinning and the stripped organic phase 5 is circulated back to extraction stage E2.

FIG. 1 shows how considerably the size of the washing and stripping stages of the extraction process is reduced when an extractant is used according to the invention to raise the viscosity of the extraction solution. In fact the reduction is in direct ratio to the external extraction solution pumping, because the mixer-settlers in question are dimensioned directly with the solution flows in all respects, pumping, mixing and solution separation.

Therefore, in cases where the extractant content is raised for example to double the amount normally used, and external extraction solution pumping is correspondingly decreased to half the normal flow, the mixer and settler volumes of the washing and stripping stages are halved. The actual extraction stages E1 and E2 remain almost their earlier size and the same external extraction solution pumping goes through them, but the extraction solution can be circulated within the stages in order to maintain extraction solution continuity. The extraction solutions flow through each stage of the extraction equipment at essentially the same time. As mentioned above, the O/A mixing ratio of the solutions may be reduced according to the method of the invention to below 1 to a value between 0.7–1.0, and the size of the extraction stages equipment can be reduced correspondingly.

When estimating the effect of our invention on the size of the extraction equipment, it should be noted that FIG. 1 is only indicative of the relative size of the extraction stages and that of the washing and stripping stages. There are often two stripping stages in an extraction plant and in some cases also two washing stages. Then the savings made by reducing the size of the equipment are correspondingly greater. The amount of extraction solution inside the extraction plant is also reduced correspondingly even if the changes in the amount of extractant itself are not large, since the content of extractant in the extraction solution has been raised. In certain cases it is expedient even to raise the amount of extraction agent circulating in the process, so that the advantages described in the method can be achieved in full measure.

The method according to our invention provides the opportunity to treat difficult impurities such as copper ore containing chloride, nitrate or manganese in an economical way. In particular, ores containing a lot of iron are generally problematic, because iron increases the transfer of the above-mentioned impurities to the electrolyte via the extraction solution. This results in a situation where it is even more important than before to prevent the transfer of said impurities first to the extraction solution with the unseparated drops of aqueous solution from extraction stage E1 to washing stage W and from there on to stripping stage S.

According to our invention it is now possible to use equipment that is smaller than usual in the washing stage, but as it is known on the other hand, a prolonged settling time in the washing stage (larger settler) improves the separation of impurities. Now it is possible to enlarge the washing stage, in particular its settler section in relation to the extraction solution flow used, for instance the size of a settler according to the conventional method without increasing costs and to achieve better separation of impurities than before. In practice this means that in the washing and stripping stages the mixing and separating times are longer, i.e. the solutions flow through them more slowly than through the actual extraction stages. With this system our method offers the possibility for flexible, case-specific dimensioning.

When poor copper ores are processed by direct leaching, the result, as stated above, is an aqueous solution with a copper content in the range of 1–4 g/l, and in addition neutral salts accumulate in the solution. The sulphate content of the solution may rise to between 40–120 g/l, which causes a rise in the viscosity of the aqueous solution, but on the other hand, sulphate has the benefit of acting as a pH buffer when using copper extraction in the pH range of 0.8–2.2. In other words it improves the equilibrium of the copper extraction and makes more copper transfer to the extraction solution.

EXAMPLE 1

A series of tests were carried out, which show that the separation of the organic solution and the aqueous solution from each other improves when the viscosity of the organic phase is raised by increasing the extractant content in copper extraction according to our invention. Table 1 presents the composition of the extraction solution and the results obtained.

The aqueous solution was made using ion-exchanged water, copper sulphate and sulphuric acid. The copper content of the solution was 2 g/l, the sulphate content 52 g/l and the pH 1.8. The extraction solution was prepared by mixing the commercial extractants shown in the table in different proportions with a commercial kerosene solution D70 as diluting agent. Mixing contact was made between the extraction solutions and the copper sulphate solution (aqueous solution) at room temperature and in the O/A phase ratio of 1.0, thereby obtaining the copper content values of the solutions in the table. After mixing all the solutions were recovered and stored for two weeks before the actual mixing tests. This ensured that the extraction solutions in particular corresponded to the solutions used in normal extraction, without the drawbacks of new extraction solutions.

A double helix agitator as described in U.S. Pat. No. 5,185,081, with a diameter of 152 mm and height of 174 mm was used in the mixing tests. The mixer itself was a flat-bottomed cylinder with a diameter of 214 mm and effective solution depth also of 214 mm. The cylinder was equipped with four baffles positioned on the frame of the cylinder, with a width of 18 mm and at a distance of 3.5 mm from the inner surface of the cylinder.

The mixing contact itself was made at room temperature and in the O/A phase ratio of 1.0 so that the extraction solution was continuous in all tests and the aqueous solution in drops. The revolution speed of the mixer was 220 rpm and the duration of mixing was 3 minutes in all tests. In all tests each extraction solution was mixed with a new batch of the aqueous solution. After mixing the solutions were made to separate by the effect of gravity. 15 minutes after mixing the amount of residue solution in each of the separated solutions was determined. The drop residues (entrainment levels) are shown in Table 1, where A/O means water in the extraction solution and O/A means organic phase drops in the aqueous solution.

TABLE 1

| Test | Extr. sol. Extractant | til.-% | Dil. agent | til.-% | Visces. cP | Cu/extr. sol. g/l | Residual drops A/O ppm | Residual drops O/A ppm |
|---|---|---|---|---|---|---|---|---|
| 1 | Acorga M5640 | 5 | D70 | 95 | 2,7 | 2 | 500 | 90 |
| 2 | Acorga M5640 | 8,5 | D70 | 91,5 | 3 | 3,5 | 460 | 70 |
| 3 | Acorga M5640 | 15 | D70 | 85 | 3,3 | 6,2 | 150 | 40 |
| 4 | Acorga M5640 | 25 | D70 | 75 | 4,2 | 7,4 | 100 | 25 |
| 5 | Acorga M5640 | 30 | D70 | 70 | 4,9 | 13,7 | 150 | 25 |
| 6 | LIX994N | 40 | D70 | 60 | 6,1 | 19,8 | 50 | 15 |
| 7 | Acorga M5640 | 50 | D70 | 50 | 8,2 | 20,1 | 50 | 12 |

The tests show that raising viscosity by increasing the extractant (extraction reagent) content clearly decreases the amount of residual drops in the settled solutions.

EXAMPLE 2

An aqueous solution was prepared with a copper content of 1.5 g/l, sulphate content of 50 g/l and pH of 1.8. Three different extraction solutions were also prepared:

| | | |
|---|---|---|
| 1. | Acorga M5640 | 5.0 vol.-% |
| | D70 | 95 vol.-% |
| 2. | Acorga M5640 | 15.0 vol.-% |
| | D70 | 85 vol.-% |
| 3. | Acorga M5640 | 25.0 vol.-% |
| | D70 | 15 vol.-% |

The first solution represents an extraction solution according to the prior art.

Figure 2:
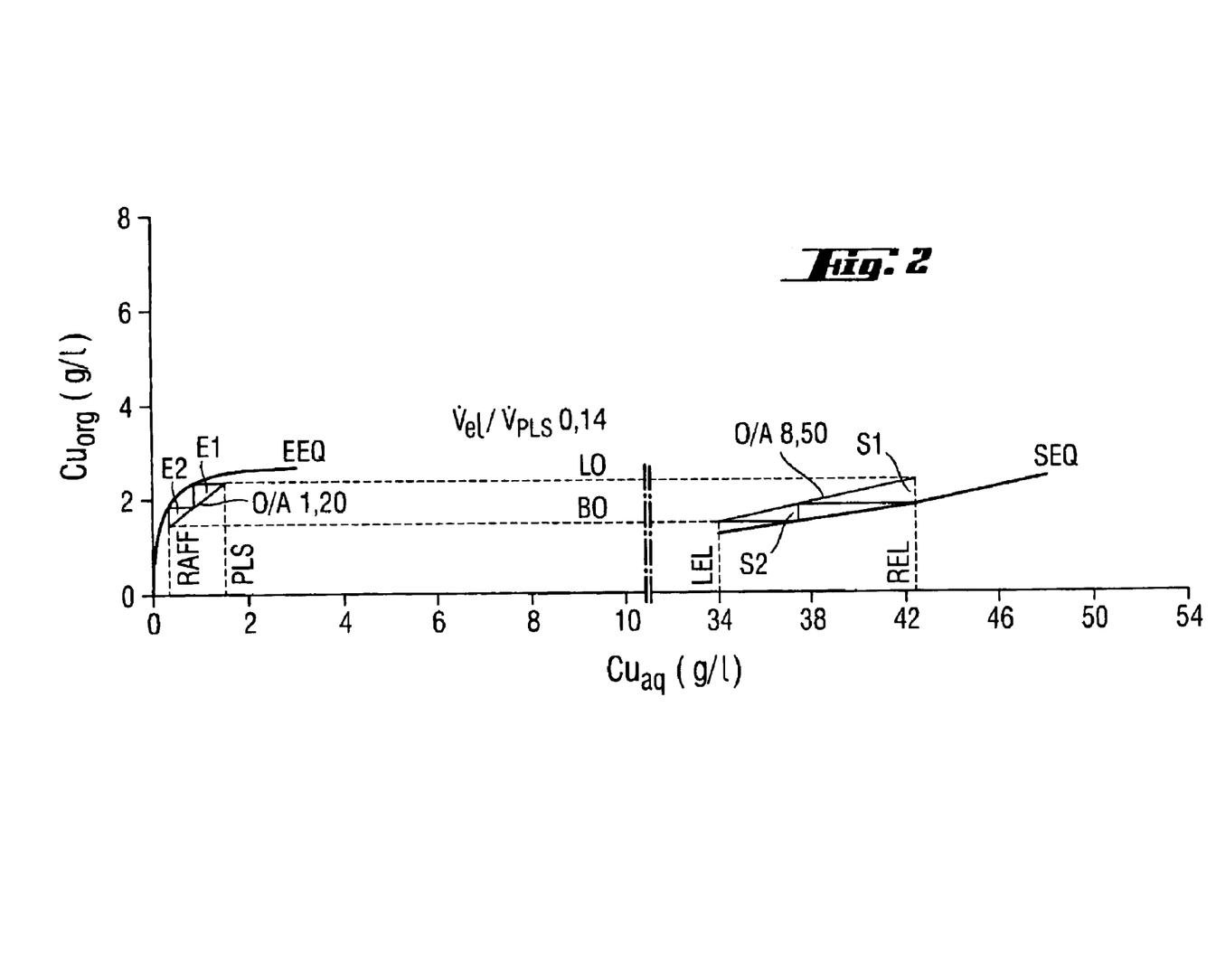
FIG. 2 shows a stage calculation of the prior art, where the copper content of the aqueous solution (PLS=pregnant leach solution) coming to the extraction stage is 1.5 g/l and the extractant content of the extraction solution is 5 vol. % Acorga M 5640.
Figure 3:
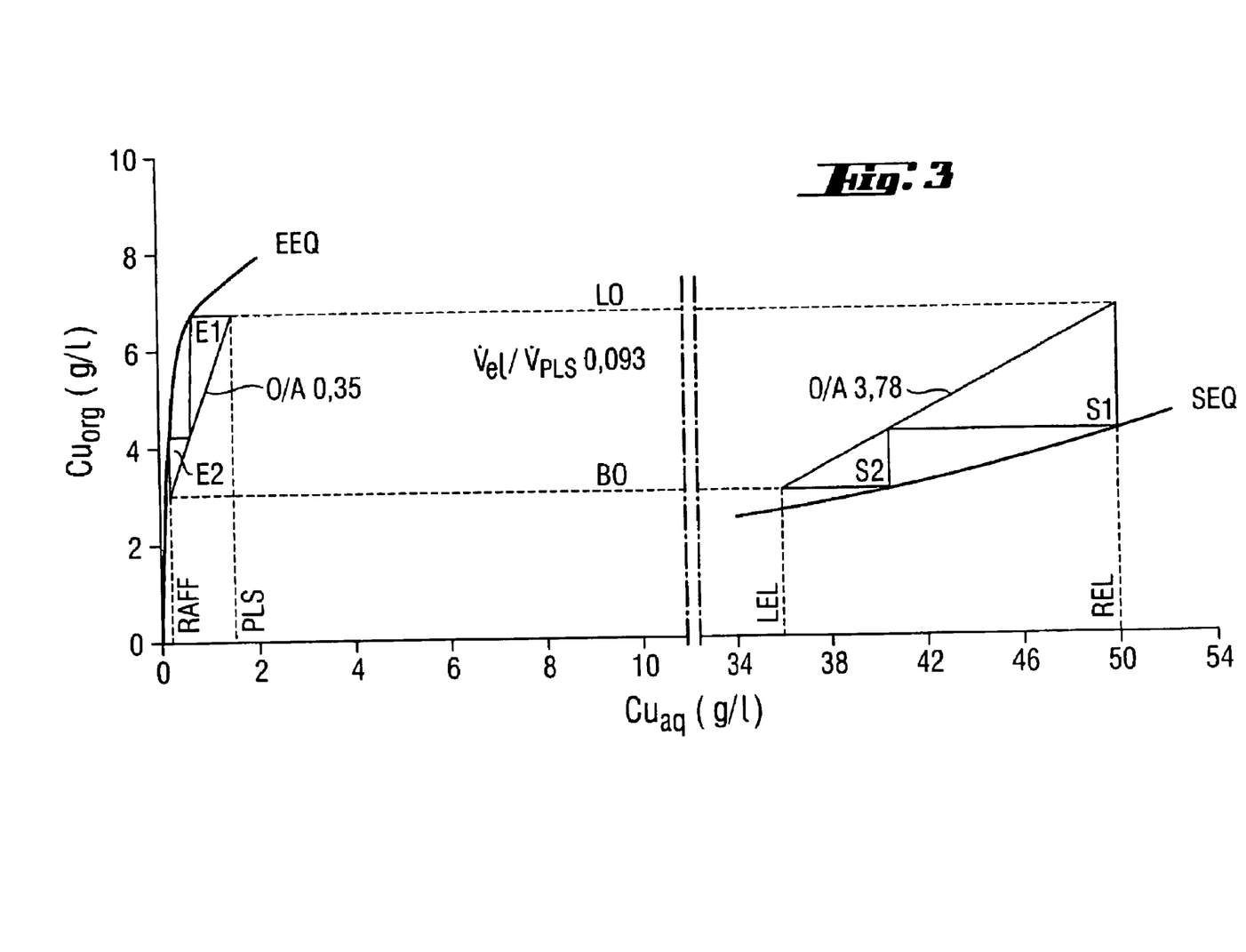
FIG. 3 shows a stage calculation according to the present invention, where the copper content of the PLS is 1.5 g/l and the extractant content of the extraction solution is 15 vol. % Acorga M 5640.
Figure 4:
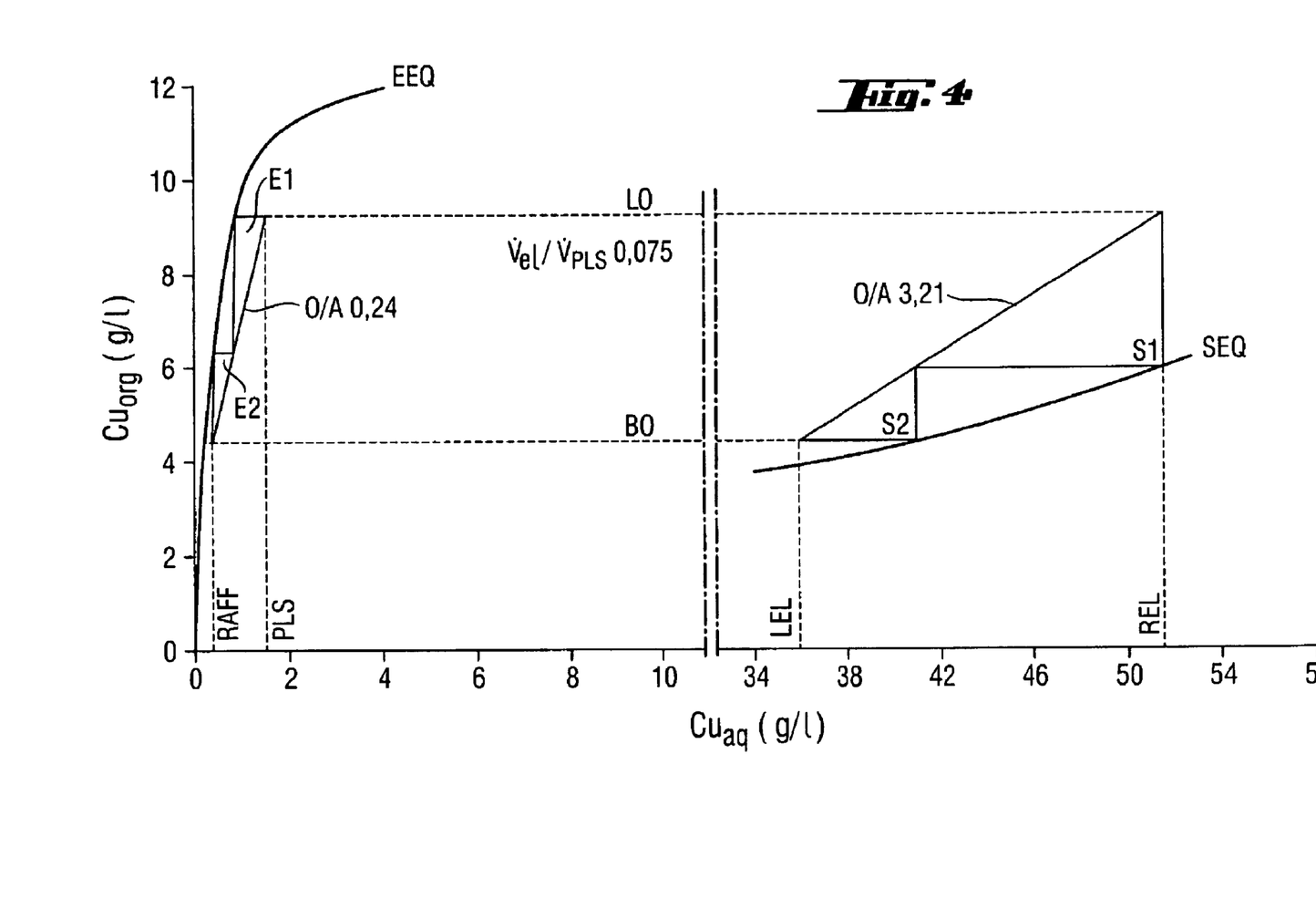
FIG. 4 shows a stage calculation according to the present invention, where the copper content of the PLS is 1.5 g/l and the extractant content of the extraction solution is 25 vol. % Acorga M 5640.

Extraction equilibrium curves EEQ and stripping equilibrium curves SEQ shown in FIGS. 2, 3 and 4 were defined for the extraction solutions and aqueous solutions in question with the method used by experts in this field. Diagram 2 shows the prior art, diagrams 3 and 4 the method according to this invention. Next, making use of the equilibrium data in question, an extraction calculation was made for a copper extraction process with two extraction stages functioning on the counterflow principle and two stripping stages. The calculation was made on the basis of the McCabe-Thiele method, familiar to specialists in the field. The extraction and stripping stages reach as far as the equilibrium curve, because the stage efficiency is very high when using for instance the equipment described in WO patent publications.

The three stage calculations presented in the example show that the copper extraction yield remains at a good level and almost unchanged, even though the external pumping of the extraction solution is reduced. The copper contents of the raffinate are in all cases 0.2–0.4 g/l. The lowest cont nt is obtained by raising the extractant content to 15%, whereby the external pumping of the extraction solution can be reduced to 35% of the PLS (pregnant leach solution) feed i.e. copper-containing aqueous solution feed. It is apparent from the stage calculation in question that the extraction equilibrium remains good in extraction conditions (the EEQ curve rising steeply when the Cu content of the aqueous solution is under 0.5 g/l) over its extraction solution copper content level, set for the extraction solution after the second stripping stage S2 (dotted line BO, e.g. 3.0 g/l in FIG. 3).

Another essential factor is that the stripping equilibrium allows the making of strong copper electrolyte when the copper content of the extraction solution can be lowered sufficiently. This means the level where the extraction equilibrium is still rising sharply in an aqueous solution Cu content of under 0.5 g/l, as stated earlier. The stage calculation reveals that with the method according to the present invention, a significant improvement is achieved in the copper content of the electrolyte going to copper electrolysis. With two stripping stages the electrolyte was made almost saturated as regards copper sulphate.

In different stage calculations the copper electrolyte developed as follows: in a normal copper process (extractant content 5 vol. %) the copper content of the "poor" electrolyte (LEL=lean electrolyte) coming to the washing stage is to be kept as low as 34 g/l and in the "rich" electrolyte (REL=rich electrolyte) the content may rise to the value of 42.5 g/l. In the present method the corresponding values are 36 g/l and 50 g/l when using an extractant content of 15 vol. % and 36 g/l and 51.5 g/l when using an extractant content of 25 vol. %.

In the method according to the present invention a smaller amount than usual of extraction solution is circulated in relation to the PLS solution. Likewise the electrolyte circulation is correspondingly much smaller. In order to describe the information included in the stage calculations the circulation of the solutions can be checked for instance on the basis of diagram 3. The stage calculation is in two parts: extraction on the left and stripping on the right. The solution compositions of the different stages can be seen at the intersection points of the stages and the equilibrium curves. For example, in extraction stage E1 the Cu content of the aqueous solution decreases from the PLS content of 1.5 g/l to 0.6 g/l and the Cu content of the extraction solution rises from the E2 content of 4.2 g/l to 6.7 g/l. In stripping stage S1 the extraction solution on the other hand falls from an LO (loaded organic) value of 6.7 g/l to 4.2 as the Cu content of the copper electrolyte rises from 40.4 g/l to 50.0 g/l. The Cu content of the extraction solution falls further to a BO (barren organic) value of 3.0 in stripping stage S2, from where the extraction solution moves on to extraction stage E2 of the extraction.

The important points in said stage calculations are the so-called operating lines which indicate the contents in which the solutions touch each other when entering or leaving the first extraction and stripping stages E1 and S1 and the final extraction and stripping stages E2 and S2 and in between said stages. From the nature of the stage calculations it follows that the gradient of the operating lines indicate the external solution pumping i.e. the ratio of PLS and extraction solution flows in extraction as well as the ratio of electrolyte and extraction solution flows in stripping. It has been possible to calculate from the external pumping ratios how much the electrolyte circulation is reduced with our method in relation to the amount of PLS flow.

Certain figures characteristic of our invention have been assembled in Table 2, when the extractant contents of the extraction solution are 15 and 25 vol. % and these figures are compared with figures for conventional copper extraction, where the extractant content is 5 vol. %. The copper content of the aqueous solution (PLS) is 1.5 g/l in all cases. The extractant is Acorga M5640 and the diluting agent kerosene D70. The temperature of the extraction solution is 18° C.

TABLE 2

| Quantity | Kuva 2 | Kuva 3 | Kuva 4 |
| --- | --- | --- | --- |
| Extractant content, vol-% | 5 | 15 | 25 |
| Viscosity of extraction solution, cP | 2,7 | 3,3 | 4,2 |
| Cu content of raffinate, g/l | 0,3 | 0,2 | 0,4 |
| Rise in Cu content of extraction solution, g/l | 1 | 3,7 | 4,9 |
| Rise in Cu content of electrolyte, g/l | 8,5 | 14 | 15,5 |
| Rich electrolyte content, g/l | 42,5 | 50 | 51,5 |
| Ext. solution pumping ratio in extraction O/A | 1,2 | 0,35 | 0,24 |
| Ext. solution pumping ration in stripping O/A | 8,5 | 3,8 | 3,2 |
| Flow ratio of electrolyte and PLS | 0,14 | 0,09 | 0,08 |

From this table the advantages given by our invention are apparent. In addition to the raised viscosity of the extraction solution and the fact that the solutions can be separated cleanly, it has been possible to reduce essentially the size of the equipment for handling the extraction solution in the extraction process, such as washing and stripping equipments, as well as other extraction solution equipment for the external circulation of the extraction solution, such as storage tanks and post-separators for separating the residue solutions. Likewise the size of the equipment for handling the electrolyte is reduced, such as flotation and pressure filtration apparatus, any possible post-separators and storage tanks. Another important factor is that the copper content can be raised, ensuring the quality of the copper.

EXAMPLE 3

Figure 5:
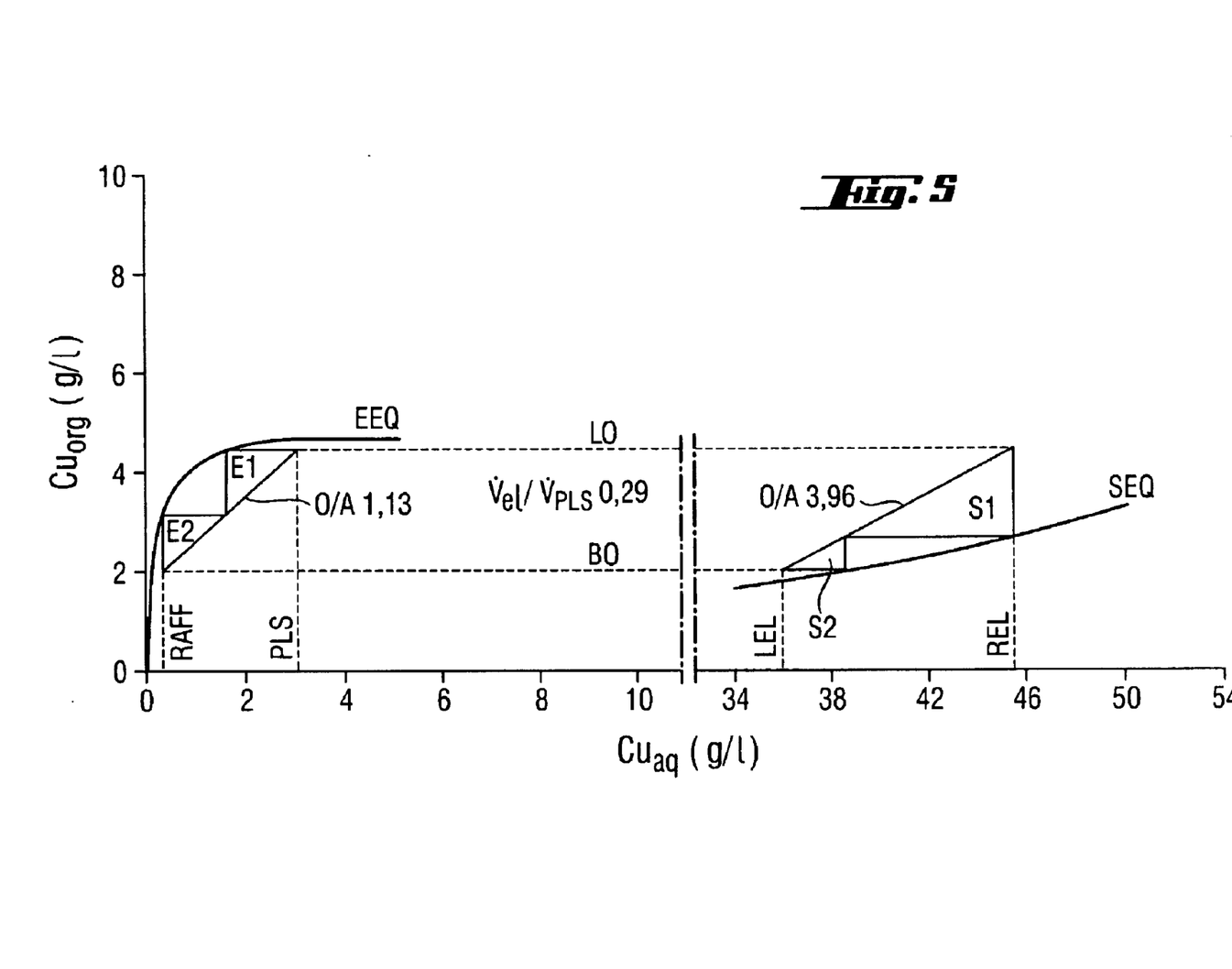
FIG. 5 shows a stage calculation according to the prior art, where the copper content of the PLS is 3.0 g/l and the extractant content of the extraction solution is 8.5 vol. % Acorga M 5640.
Figure 6:
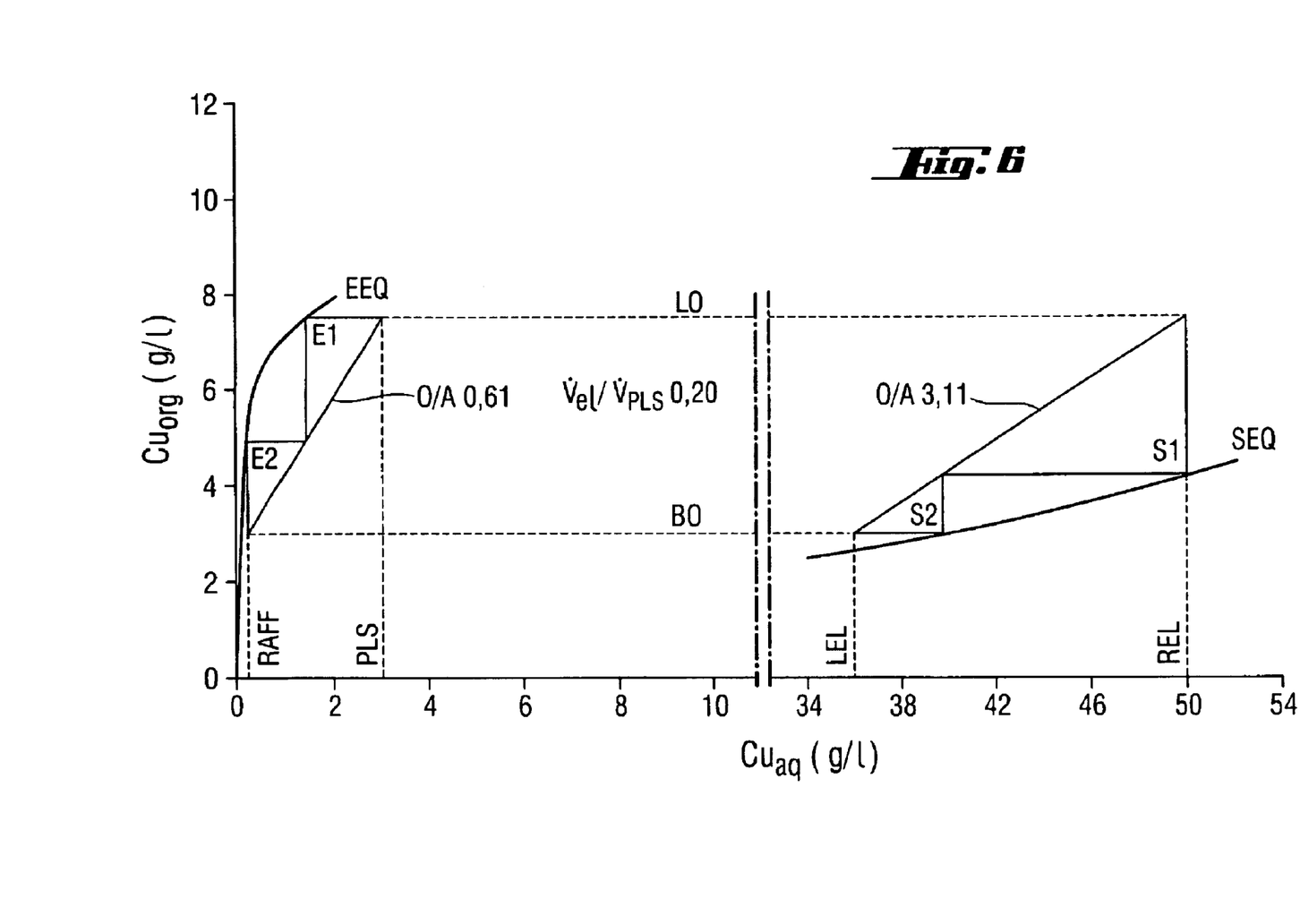
FIG. 6 shows a stage calculation according to the present invention, where the copper content of the PLS is 3.0 g/l and the extractant content of the extraction solution is 15 vol. % Acorga M 5640.
Figure 7:
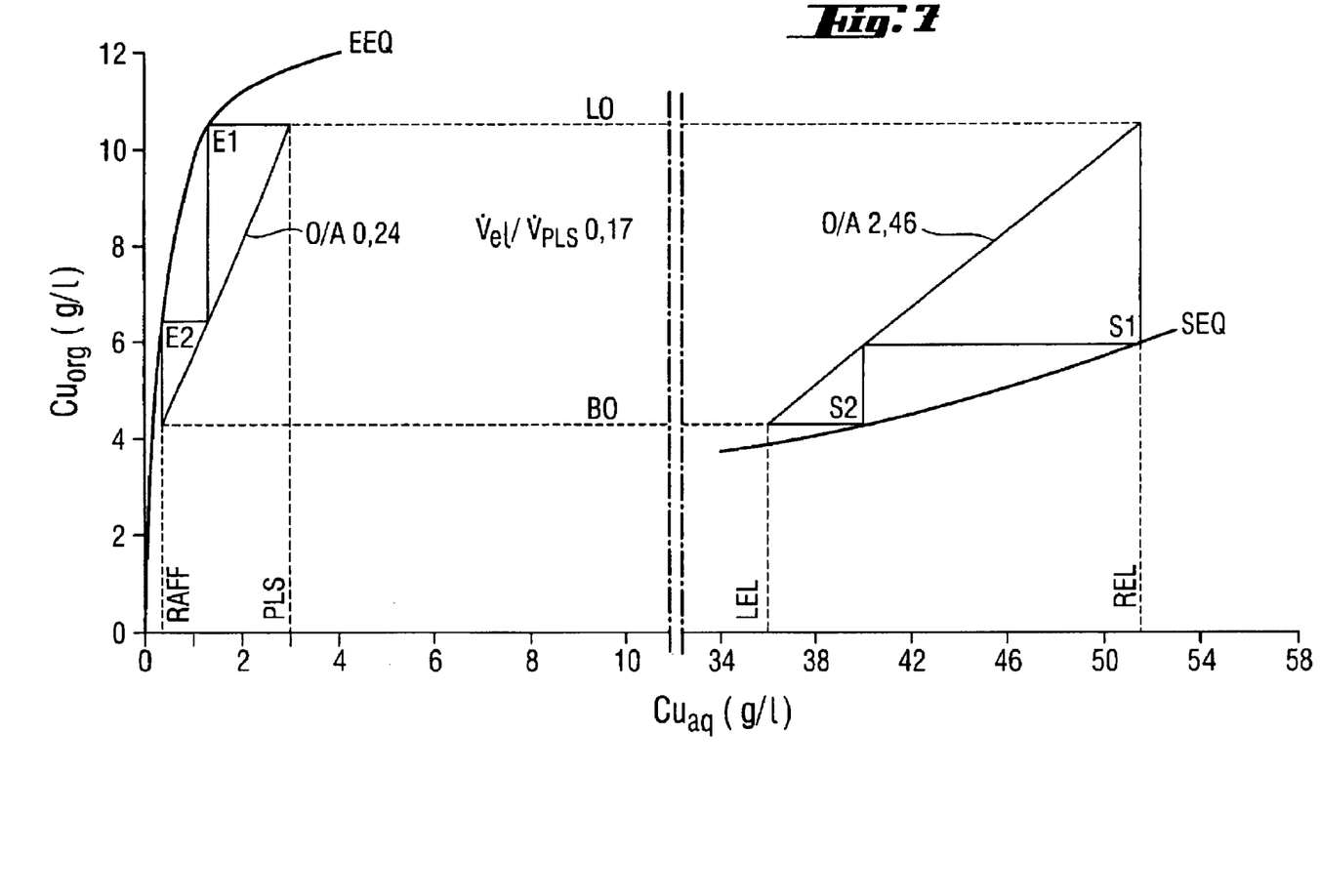
FIG. 7 shows a stage calculation according to the present invention, where the copper content of the PLS is 3.0 g/l and the extractant content of the extraction solution is 25 vol. % Acorga M 5640.

In this example the performance values according to the prior art are shown in diagram 5 and the values of the method according to the present invention in diagrams 6 and 7, based on the presented stage calculations. These again show that the method helps reduce the size of the equipment considerably. The copper content of the aqueous solution is 3 g/l, i.e. still a dilute solution. The extractant content of an ordinary solution, given first in the table, is 8.5 vol. % and the following 15 and 25 vol. % according to this invention, as in the previous example. The extractant and diluting agent used are the same as in example 2. The temperature of the extraction solution is 18° C.

TABLE 3

| Quantity | Kuva 5 | Kuva 6 | Kuva 7 |
| --- | --- | --- | --- |
| Extractant content, vol-% | 8,5 | 15 | 25 |
| Viscosity of extraction solution, cP | 3 | 3,3 | 4,2 |
| Cu content of raffinate, g/l | 0,3 | 0,25 | 0,35 |
| Rise in Cu content of extraction solution, g/l | 2,4 | 4,5 | 6,3 |
| Rise in Cu content of electrolyte, g/l | 9,5 | 14 | 15,5 |
| Rich electrolyte content, g/l | 45,5 | 50 | 51,5 |
| Ext. solution pumping ratio in extraction O/A | 1,13 | 0,61 | 0,42 |
| Ext. solution pumping ration in stripping O/A | 3,96 | 3,11 | 2,46 |
| Flow ratio of electrolyte and PLS | 0,29 | 0,2 | 0,17 |

EXAMPLE 4

Figure 8:
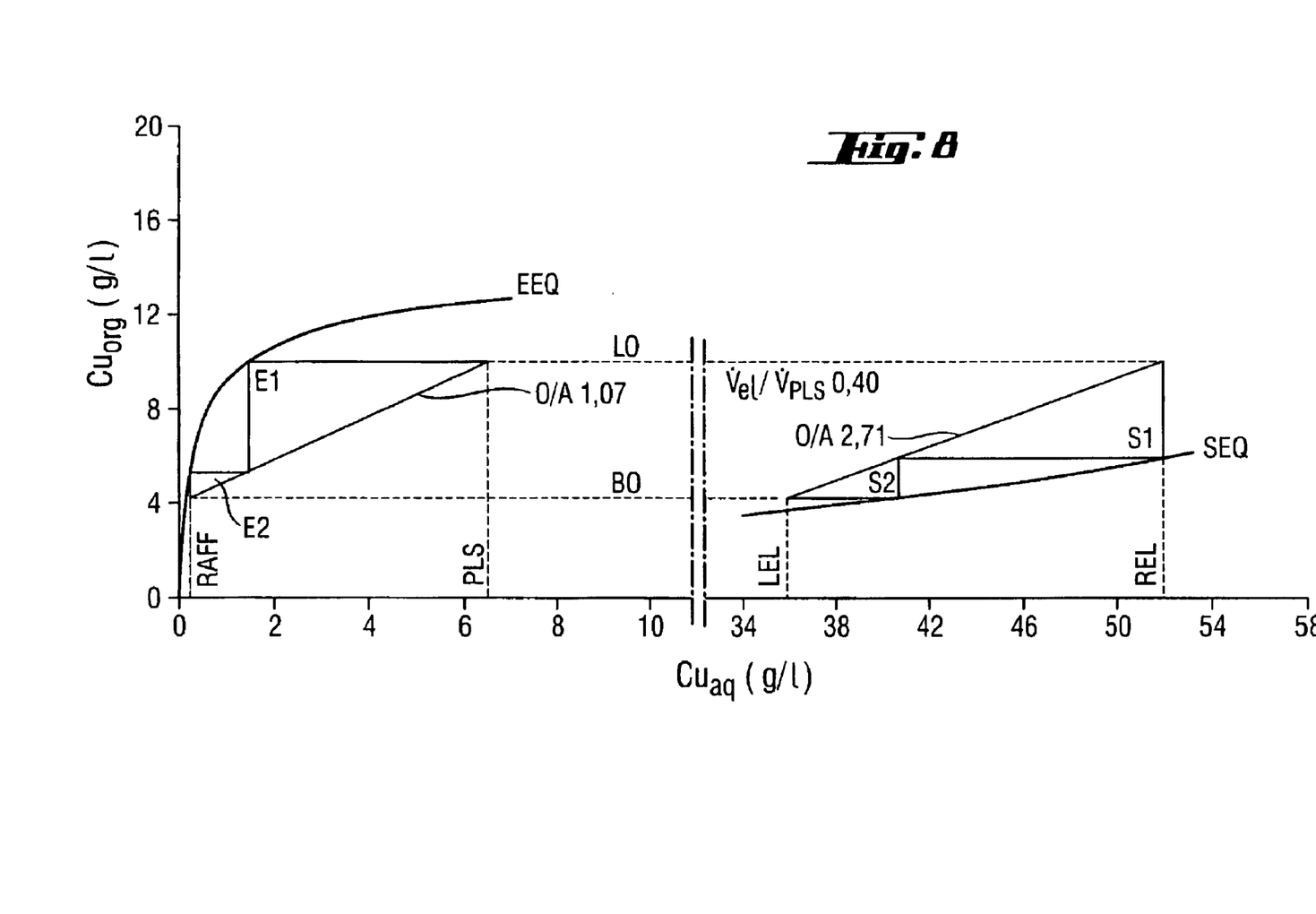
FIG. 8 shows a stage calculation according to the present invention, where the copper content of the PLS is 6.5 g/l and the extractant content of the extraction solution is 22 vol. % Acorga M 5640.
Figure 9:
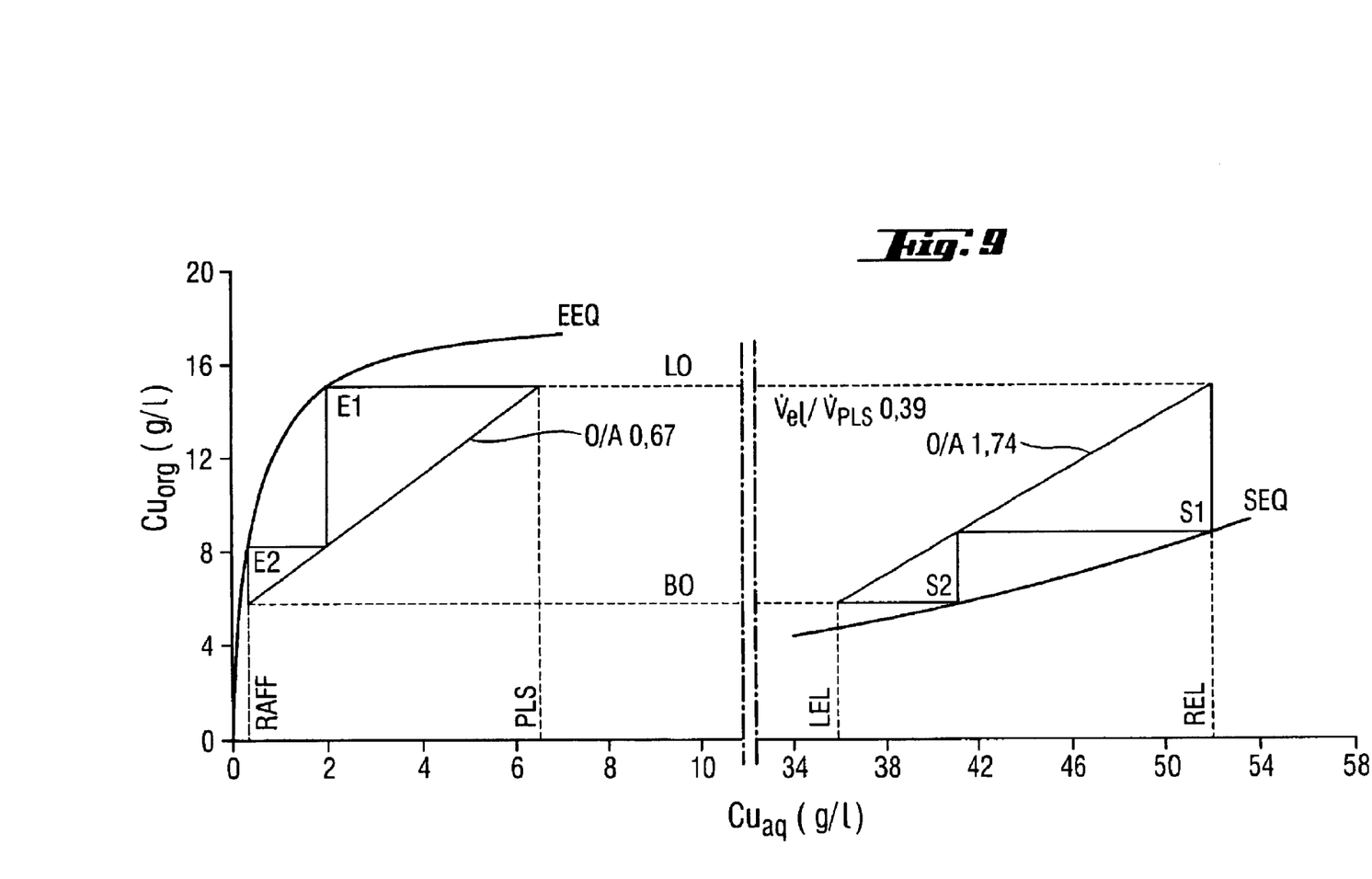
FIG. 9 shows a stage calculation according to the present invention, where the copper content of the PLS is 6.5 g/l and the extractant content of the extraction solution is 30 vol. % Acorga M 5640.
Figure 10:
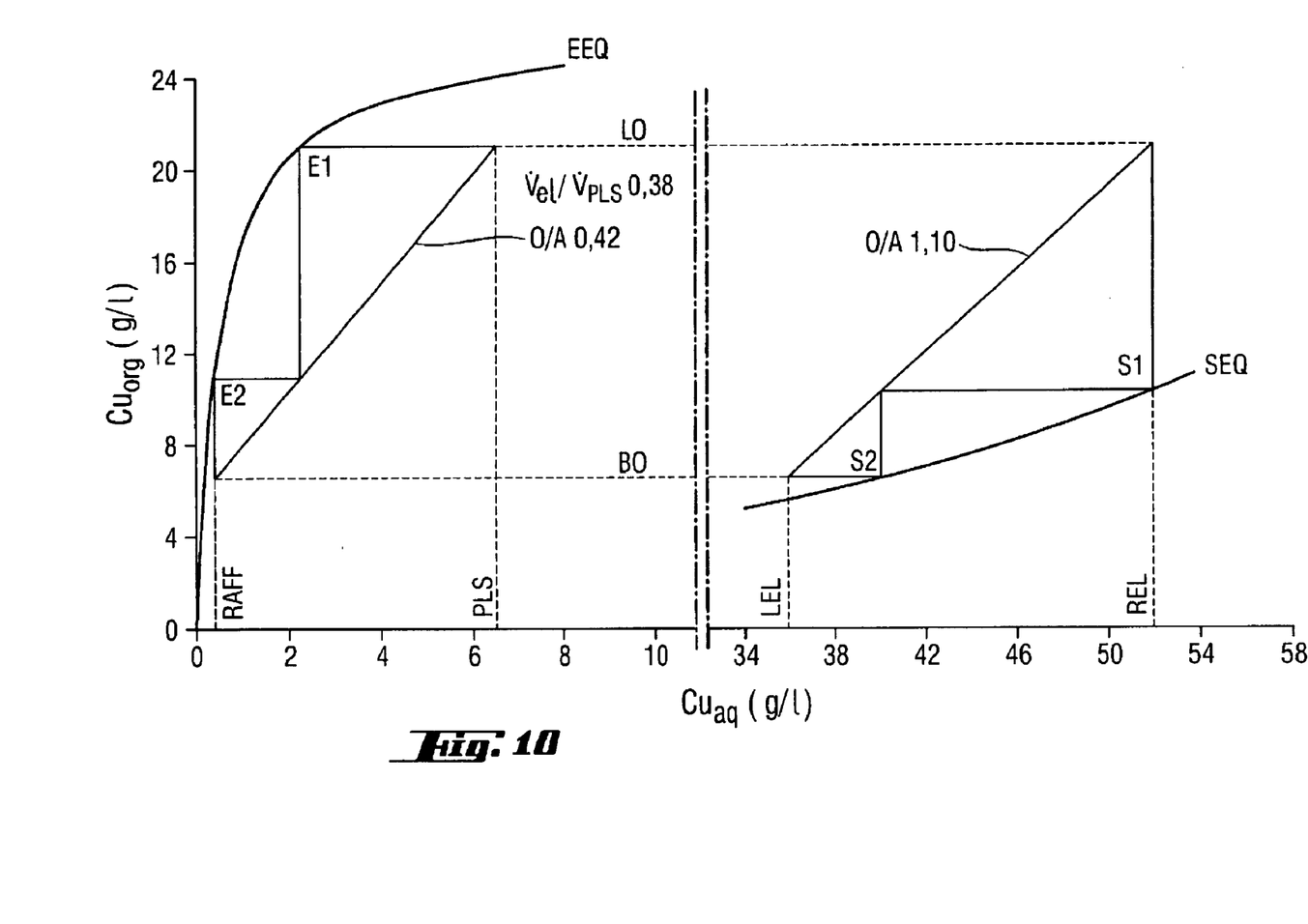
FIG. 10 shows a stage calculation according to the present invention, where the copper content of the PLS is 6.5 g/l and the extractant content of the extraction solution is 40 vol. % Acorga M 5640.

In this example, an aqueous solution was used with a Cu content of 6.5 g/l, in other words richer than is usually achieved with direct leaching of any poor ore. However, even when treating this kind of solution our method has distinct advantages. In the next table the stage calculations of diagrams 8, 9 and 10 were used. The contents of the extraction solution are 22, 30 and 40 vol. %, the extractant Acorga M6540 and the diluting agent again kerosene D70. The temperature of the extraction solution was 18° C.

TABLE 4

| Quantity | FIG. 8 | FIG. 9 | FIG. 10 |
| --- | --- | --- | --- |
| Extractant content, vol-% | 22 | 30 | 40 |
| Viscosity of extraction solution, cP | 3,7 | 4,9 | 6,3 |
| Cu content of raffinate, g/l | 0,2 | 0,3 | 0,4 |
| Rise in Cu content of extraction solution, g/l | 5,9 | 9,2 | 14,5 |
| Rise in Cu content of electrolyte, g/l | 16 | 16 | 16 |
| Rich electrolyte content, g/l | 52 | 52 | 52 |
| Ext. solution pumping ratio in extraction O/A | 1,07 | 0,67 | 0,42 |
| Ext. solution pumping ration in stripping O/A | 2,71 | 1,74 | 1,1 |
| Flow ratio of electrolyte and PLS | 0,4 | 0,39 | 0,38 |

EXAMPLE 5

This example studied the possibility of reducing the external pumping of the extraction solution considerably by raising its extractant content to a significantly high level. When the pH of the base solution is close to 2 and the same aqueous solution contains sulphates, the extraction equilibrium is very beneficial when the copper content of the aqueous solution is low. In the case of the example the Cu content of the aqueous solution is 2.5 g/l, the pH is 1.8 and the amount of sulphates 50 g/l. According to this example the method of the present invention increases the copper extraction yield. As shown by the stage calculation in FIG. 11, a very low raffinate content of 0.15 g/l copper is obtained while the external pumping of the extraction solution ratio drops to as low as 0.15. The external pumping of the electrolyte in ratio to the external pumping of the PLS also settles at the same value of 0.15. In this example the extractant used was the commercial chemical LIX 984N, which is similar to the reagent used in the previous example, and again kerosene D70 was the diluting agent. The extractant content was 50 vol. %.

TABLE 5

Figure 11:
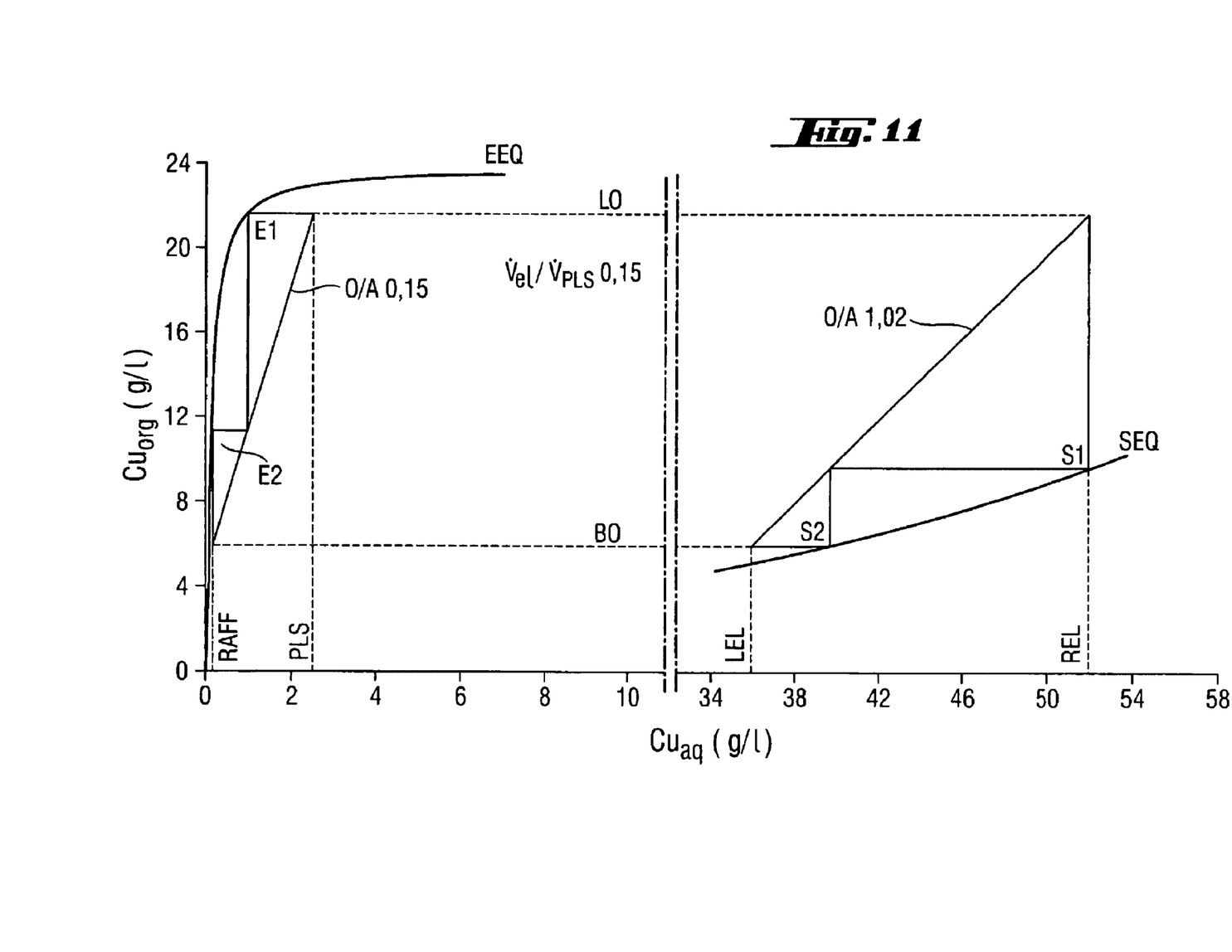
FIG. 11 shows a stage calculation according to the present invention, where the copper content of the PLS is 2.5 g/l and the extractant content of the extraction solution is 40 vol. % LIX 984N.

| Quantity | FIG. 11 |
| --- | --- |
| Viscosity of extraction solution, cP | 8 |
| Cu content of raffinate, g/l | 0,15 |
| Rise in Cu content of extraction solution, g/l | 15,7 |
| Rise in Cu content of electrolyte, g/l | 16 |
| Rich electrolyte content, g/l | 52 |
| Ext. solution pumping ratio in extraction O/A | 0,15 |
| Ext. solution pumping ration in stripping O/A | 1,02 |
| Flow ratio of electrolyte and PLS | 0,15 |

EXAMPLE 6

The example shows how high the copper content of the PLS can be raised using our invention. In this example the Cu content of the PLS was raised up to 32 g/l while the extractant content of the extraction solution was raised to 50 vol. %, with Acorga M5640 as reagent and kerosene D70 as diluting agent. Mixing with the double helix mixer mentioned above is successful, even though an extractant content of as much as 40–70 vol. % is used. It is advantageous to do this when it is desired to reduce external pumping of the extraction solution. The stage calculation concerning 50 vol. % in FIG. 12 and the summary in Table 6 clarify these possibilities further.

TABLE 6

Figure 12:
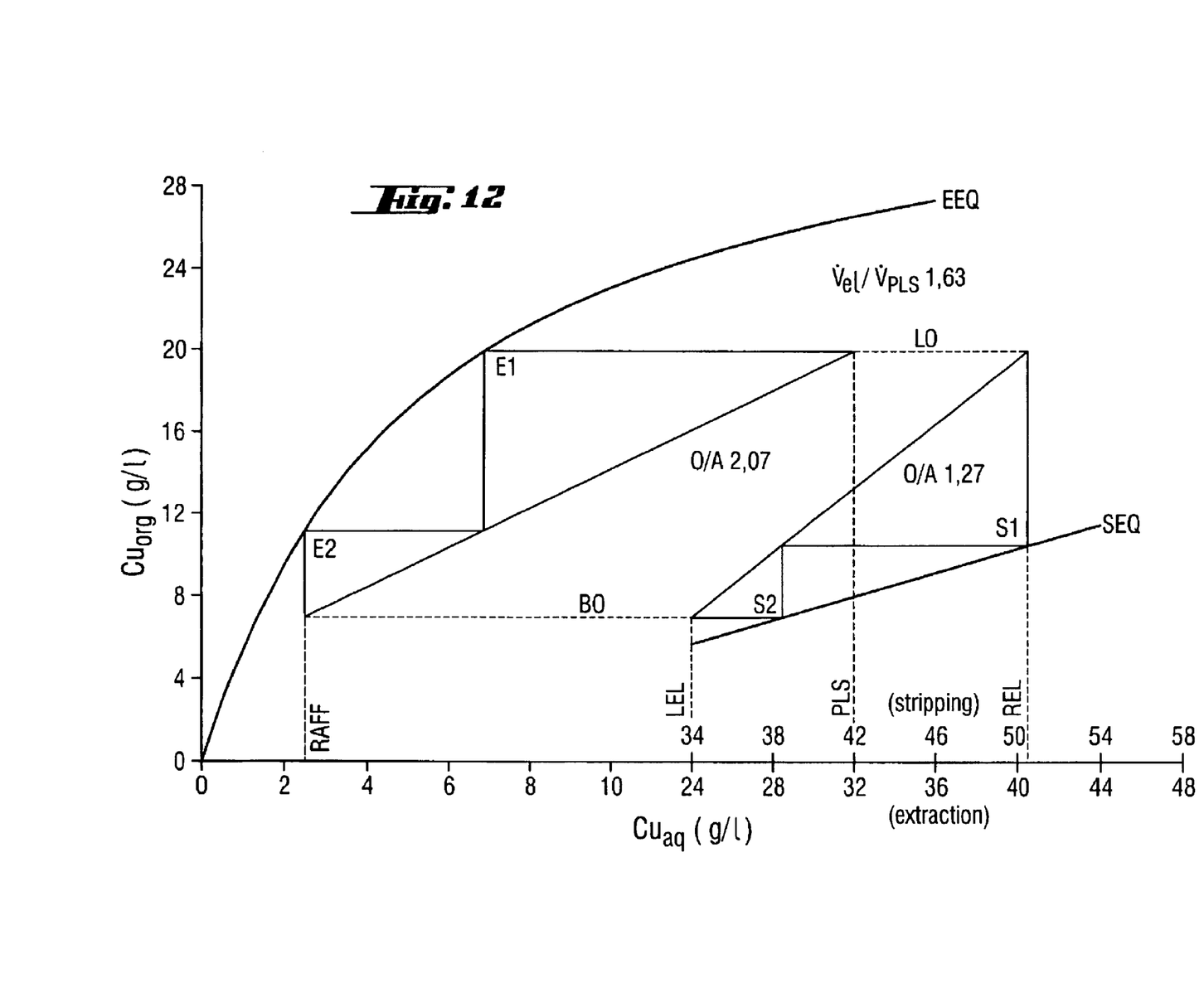
FIG. 12 shows a stage calculation according to the present invention, where the copper content of the PLS is 32 g/l and the extractant content of the extraction solution is 50 vol. % Acorga M 5640.

| Quantity | FIG. 12 |
| --- | --- |
| Viscosity of extraction solution, cP | 8,2 |
| Cu content of raffinate, g/l | 5 |
| Rise in Cu content of extraction solution, g/l | 13 |
| Rise in Cu content of electrolyte, g/l | 16,5 |
| Rich electrolyte content, g/l | 50,5 |
| Ext. solution pumping ratio in extraction O/A | 2,07 |
| Ext. solution pumping ration in stripping O/A | 1,27 |
| Flow ratio of electrolyte and PLS | 1,63 |

What is claimed is:

1. A method for liquid-liquid extraction of copper from an aqueous solution containing more than about 40 g/l of sulphates the method comprising feeding an organic extraction solution and said aqueous solution into a plurality of extraction stages, said extraction solution containing an extractant, extracting copper in said extraction stages from said aqueous solution in the presence of said organic extraction solution by raising the viscosity of said organic extraction solution to a range of 3–11 cP and dispersing the aqueous solution into drops in the extraction solution while adjusting the volumetric ratio of the extraction solution to the aqueous solution to between 0.7–1.0.

2. A method according to claim 1, wherein the viscosity of the extraction solution is raised by raising the content of the extractant in the extraction solution.

3. A method according to claim 2, wherein the viscosity of the extraction solution is raised by regulating the extractant content of the extraction solution in the range of 15–70 vol. %.

4. A method according to claim 3, wherein said aqueous solution has a copper content up to about 2 g/l, and the viscosity of the extraction solution is raised by adjusting the content of the extractant in the extraction solution to the range of 15–25 vol. %.

5. A method according to claim 4, wherein the external pumping ratio of the extraction solution and the aqueous solution fed into the extraction stages adjusted to the range of 0.2–0.5 and the ratio between a stripped copper electrolyte and the aqueous solution of the extraction is adjusted to the range of 0.08–0.2.

6. A method according to claim 3, said aqueous solution has a copper content of 2–4 g/l, and the viscosity of the extraction solution is raised by adjusting the content of the extractant in the extraction solution to the range of 15–30 vol. %.

7. A method according to claim 6, wherein the external pumping ratio of the extraction solution and the aqueous solution fed into the extraction stages is adjusted to the range of 0.3–0.7 and the ratio between a stripped copper electrolyte and the aqueous solution of the extraction is adjusted to the range of 0.15–0.25.

8. A method according to claim 3, said aqueous solution has a copper content of 4–8 g/l, and the viscosity of the extraction solution is raised by adjusting the content of the extractant in the extraction solution to the range of 25–50 vol. %.

9. A method according to claim 8, the external pumping ratio of the extraction solution and the aqueous solution fed into the extraction stages is adjusted to the range of 0.4–0.8 and the ratio between a stripped copper electrolyte and the aqueous solution of the extraction is adjusted to the range of 0.25–0.50.

10. A method according to claim 3, said aqueous solution has a copper content of over 8 g/l, and the viscosity of the extraction solution is raised by adjusting the content of the extractant in the extraction solution to the range of 40–70 vol. %.

11. A method according to claim 10, the ratio of the extraction solution and the aqueous solution fed into the extraction stages is adjusted within the range of 1–4 and the ratio between a stripped copper electrolyte and the aqueous solution of the extraction is adjusted within the range of 0.8–3.

12. A method according to claim 1, wherein the ratio between the organic solution and the aqueous solution fed into the extraction stages from outside is regulated in the range of 0.15–1.

13. A method according to claim 1, wherein the viscosity of the extraction solution is raised by using aliphatic hydrocarbons, with a viscosity of 2.7–3.2 cP when measured at ambient femperature, as diluting agent for the extraction solution.

14. A method according to claim 1, wherein the viscosity of the extraction solution is raised by using aromatic hydrocarbons, with a viscosity of about 3 cP when measured at ambient temperature, as diluting agent for the extraction solution.

15. A method according to claim 1, wherein the viscosity of the extraction solution is raised by using a mixture of aliphatic and aromatic hydrocarbons, with a viscosity of minimum 2.7 cP when measured at ambient temperature, as diluting agent for the extraction solution.

16. A method according to claim 1, wherein the sulphate content of the aqueous solution fed to solvent extraction is a minimum of 40 g/l.

17. A method according to claim 1, wherein the extracting solutions flow through each extraction stage at essentially the same time.

18. A method according to claim 1, wherein the method further includes washing and strippiing stages and the extracting solutions flow through the washing and stripping stages more slowly than the actual extracting stages.

* * * * *